United States Patent [19]

Funato

[11] Patent Number: 4,761,046
[45] Date of Patent: Aug. 2, 1988

[54] LASER BEAM RECORDING METHOD
[75] Inventor: Hiroyoshi Funato, Kanagawa, Japan
[73] Assignee: Ricoh Company, Ltd., Tokyo, Japan
[21] Appl. No.: 853,780
[22] Filed: Apr. 18, 1986
[30] Foreign Application Priority Data May 2, 1985 [JP] Japan ................................ 60-094978
May 16, 1985 [JP] Japan ................................ 60-104696

[51] Int. Cl.[4] ........................... G02B 5/32; G02B 26/10
[52] U.S. Cl. ........................................ 350/3.71; 355/4; 355/32
[58] Field of Search .................... 350/3.71, 6.5; 355/2, 355/32, 3 R, 4

[56] References Cited

U.S. PATENT DOCUMENTS

| | | | |
|---|---|---|---|
| 4,073,566 | 2/1978 | Noguchi | 350/3.71 |
| 4,120,577 | 10/1978 | Watanabe et al. | 355/4 |
| 4,125,322 | 11/1978 | Kaukeinen et al. | 355/4 |
| 4,277,128 | 7/1981 | Kawamura | 350/420 |
| 4,348,080 | 9/1982 | Funato | 350/3.71 |
| 4,487,472 | 12/1984 | Asano | 350/3.71 |

*Primary Examiner*—Bruce Y. Arnold
*Assistant Examiner*—Martin Lerner
*Attorney, Agent, or Firm*—Cooper & Dunham

[57] ABSTRACT

A plurality of laser beams are applied to a scanning medium at different positions thereon and are converted thereby to respective scanning light beams. The laser beams are modulated by color image signals representative of respective differently colored images. As the scanning medium rotates, it deflects the applied laser beams and emits them as the scanning light beams. The scanning light beams are then applied to respective photosensitive bodies to scan them, forming latent images thereon which correspond to the color image signals, respectively. The latent images are developed into respective color images which are transferred and fixed to a single recording medium thereby to form a color image thereon.

27 Claims, 4 Drawing Sheets

LASER BEAM RECORDING METHOD

BACKGROUND OF THE INVENTION

The present invention relates to a method of recording a color image with a plurality of laser beams.

Japanese Laid-Open Patent Publication No. 59 (1984)-62879 discloses a recording system for recording a color image on a recording medium by modulating a plurality of laser beams with color image signals representative of differently colored images, respectively, applying the modulated laser beams simultaneously to a plurality of photosensitive bodies, respectively, to form latent images thereon which correspond respectively to the color image signals, developing the latent images into respective visible images, and transferring and fixing the visible images to the recording medium.

The above publication discloses two recording apparatus. One of the disclosed recording apparatus employs as many laser beam scanners as the number of the photosensitive bodies used, as shown in FIG. 2 of the publication. This recording apparatus is however disadvantageous in that it is large in size, complex in structure, and costly to manufacture since a plurality of laser beam scanners are employed.

The other recording apparatus disclosed in the above publication includes a single rotating polygonal mirror for deflecting the laser beams. Due to optical design requirements, the rotating polygonal mirror is required to be elongate along an axis about which it is rotated. The cost of the recording apparatus is relatively high since the elongate polygonal mirror of high optical accuracy cannot be fabricated easily.

SUMMARY OF THE INVENTION

It is an object of the present invention to provide a novel laser beam recording method which can be achieved at a low cost without rendering complex the structure of a color laser beam recording apparatus that is used to carry out the laser beam recording method.

To accomplish the above object, a plurality of laser beams are applied to a single scanning medium or hologram disk at mutually different positions thereon to produce a plurality of scanning light beams simultaneously. As the hologram disk is rotated, the scanning light beams are led by respective optical systems toward respective different photosensitive bodies to scan the latter for forming images thereon.

Since the laser beams for scanning the respective photosensitive goes are simultaneously deflected by the single hologram disk, it is not necessary to provide as many scanning mediums as the number of the photosensitive bodies required. Therefore, a laser beam recording apparatus employed is simple in construction. The laser beam recording apparatus is inexpensive to manufacture since the scanning medium or hologram disk is less costly and easier to manufacture than the rotating polygonal mirror.

The above and other objects, features and advantages of the present invention will become more apparent from the following description when taken in conjunction with the accompanying drawings in which preferred embodiments of the present invention are shown by way of illustrative example.

DETAILED DESCRIPTION

According to the present invention, a plurality of laser beams are simultaneously deflected by one hologram disk. The hologram disk has a plurality of hologram gratings or hologram lenses arranged in a single annular pattern having its center aligned with the center of the hologram disk. The laser beams are applied to the hologram disk at mutually different positons, respectively, thereon.

As the hologram disk rotates, the laser beams are simultaneously deflected and led by respective optical systems to different photosensitive bodies to scan them to form images thereon.

Figure 1:
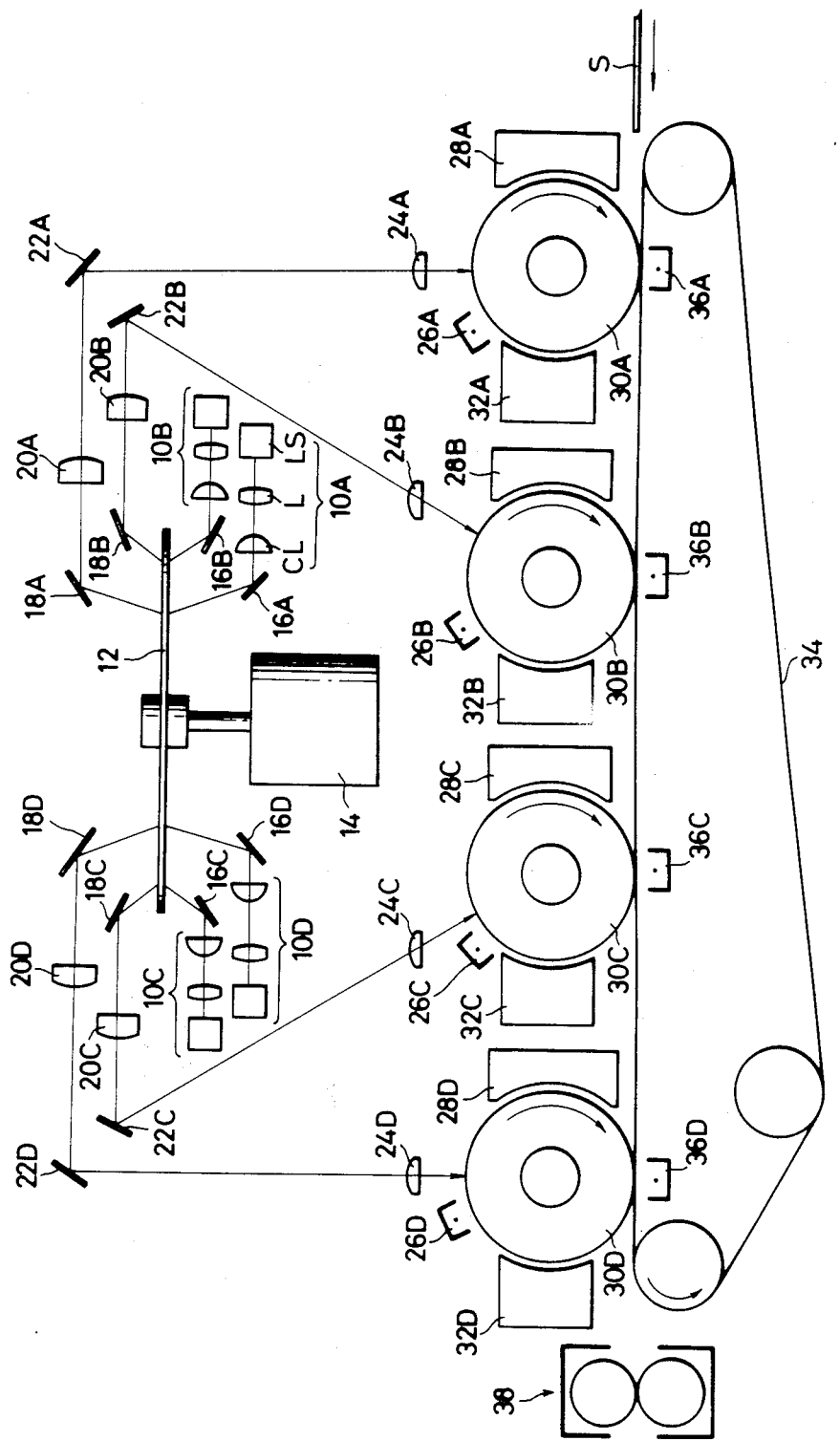
FIG. 1 is a schematic view showing an overall arrangement of a color image recording apparatus used for carrying out a laser beam recording method according to the present invention.

FIG. 1 shows a color image recording apparatus according to one embodiment for carrying a laser beam recording method of the present invention. The color image recording apparatus includes light source devices 10A, 10B, 10C, 10D, a motor 14 to which a hologram disk 12 is rotatably mounted, plane mirrors 16A, 16B, 16C, 16D, 18A, 18B, 18C, 18D, 22A, 22B, 22C, 22D, fθ lenses 20A, 20B, 20C, 20D, cylindrical lenses 24A, 24B, 24C, 24D, photoconductive photosensitive bodies 30A, 30B, 30C, 30D in the form of drums, chargers 26A, 26B, 26C, 26D, developing devices 28A, 28B, 28C, 28D, cleaners 32A, 32B, 32C, 32D, a conveyor belt 34, image transfer chargers 36A, 36B, 36C, 36D, and an image fixing device 38. Designated at S is an image transfer sheet serving as an image recording medium.

The plane mirrors 16A, 18A, the fθ lens 20A, the plane mirror 22A, and the cylindrical lens 24A jointly form an optical path extending from the light source device 10A to the photosensitive body 30A. The plane mirrors 16B, 18B, the fθ lens 20B, the plane mirror 22B, and the cylindrical lens 24B jointly form an optical path extending from the light source device 10B to the photosensitive body 30B. The plane mirrors 16C, 18C, the fθ lens 20C, the plane mirror 22C, and the cylindrical lens 24C jointly form an optical path extending from the light source device 10C to the photosensitive body 30C. Likewise, the plane mirrors 16D, 18D, the fθ lens 20D, the plane mirror 22D, and the cylindrical lens 24D jointly form an optical path extending from the light source device 10D to the photosensitive body 30D.

The photosensitive bodies 30A, 30B, 30C, 30D each in the form of a drum are identical in construction and arrayed axially parallel to each other. The chargers 26A, 26B, 26C, 26D, the developing devices 28A, 28B, 28C, 28D, the cleaners 32A, 32B, 32C, 32D, and the image transfer chargers 36A, 36B, 36C, 36D which are disposed around the respective photosensitive bodies 30A, 30B, 30C, 30D are also identical in construction, except that the developing devices 28A, 28B, 28C, 28D contain color toners of yellow, magenta, cyan, and black, respectively. The conveyor belt 34 extends in contact with the photosensitive bodies 30A, 30B, 30C, 30D for delivering the image transfer sheet S successively past the photosensitive bodies 30A, 30B, 30C, 30D. The image transfer chargers 36A, 36B, 36C, 36D are disposed behind the conveyor belt 34 in confronting relation to the photosensitive bodies 30A, 30B, 30C, 30D, respectively.

Figure 2:
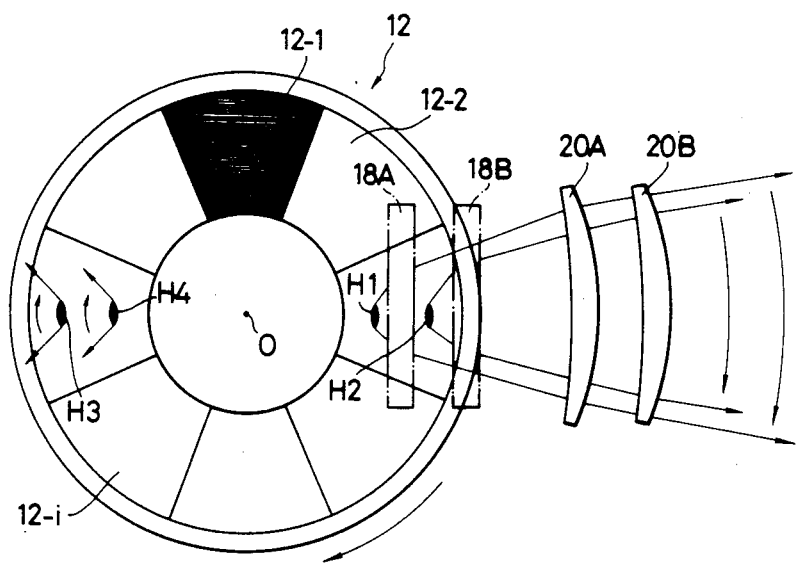
FIG. 2 is a front elevational view of a hologram disk used in the color image recording apparatus shown in FIG. 1.

As shown in FIG. 2, the hologram disk 12 has a plurality (eight in the illustrated embodiment) of hologram gratings 12-1, 12-2, . . . , 12-i arranged on a circular transparent substrate in a single annular pattern having its center aligned with the center O of the hologram disk 12. The hologram gratings 12-i comprise equally-spaced straight-line gratings which are optically equivalent to each other. The directions in which the straight lines of the gratings extend are symmetrical with respect to the center O of the hologram disk 12.

The light source devices 10A, 10B, 10C, 10D are structurally identical to each other. The light source device 10A, for example, comprises a semiconductor laser LS, a lens L, and a cylindrical lens CL.

The semiconductor lasers of the light source devices 10A, 10B, 10C, 10D are energized by color image signals representative of yellow, magenta, cyan, and black images, respectively.

When the light source devices 10A, 10B, 10C, 10D are energized, laser beams emitted therefrom are reflected by the respective plane mirrors 16A, 16B, 16C, 16D to fall on the hologram disk 12 at respective positions H1, H2, H3, H4 (FIG. 2) thereon that correspond to the light source devices 10A, 10B, 10C, 10D.

The positions H1, H2, H3, H4 and the center O of rotation of the hologram disk 12 are located on a common straight line. The positions H1, H2, H3, H4 correspond to the photosensitive bodies 30A, 30B, 30C, 30D, respectively. The laser beams applied to the hologram disk 12 are diffracted by the hologram gratings, and then pass along the respective optical paths to reach the photosensitive bodies 30A, 30B, 30C, 30D. The laser beams are converged into beam spots on the respective photosensitive bodies by the cylindrical lenses CL of the light source devices, the $f\theta$ lenses 20A through 20D, and the cylindrical lenses 24A through 24D immediately prior to the photosensitive bodies. When the hologram disk 12 is rotated by the motor 14 (FIG. 1) under this condition, the diffracted laser beams are synchronously deflected by the hologram disk 12 to enable the beam spots to scan the photosensitive bodies 30A, 30B, 30C, 30D, respectively.

The photosensitive bodies 30A, 30B, 30C, 30D are scanned by the beam spots in a direction normal to the sheet of FIG. 1, i.e., in the axial direction of the photosensitive bodies. As illustrated in FIG. 2, the positions H1, H2, H3, H4 to which the laser beams are applied lie within a plane including the axis O of rotation of the hologram disk 12 and the optical axes of the $f\theta$ lenses 20A, 20B, 20C, 20D (the $f\theta$ lenses 20C, 20D are omitted from illustration in FIG. 2). Therefore, the ranges that are scanned by the beam spots on the photosensitive bodies 30A, 30B, 30C, 30D are aligned in the axial direction of the photosensitive bodies. However, since the laser beams are deflected by the hologram disk 12 in one direction (clockwise in FIG. 2), the photosensitive bodies 30A, 30B and the photosensitive bodies 30C, 30D are scanned by the laser beam spots in opposite directions (main scanning mode). Specifically, the photosensitive bodies 30A, 30B are scanned in a direction toward the viewer of FIG. 1, whereas the photosensitive bodies 30C, 30D are scanned in a direction away from the viewer of FIG. 1. Therefore, the beginning and terminal ends of an applied one-line write-in signal for the photosensitive bodies 30C, 30D are switched around or reversed, and the one-line write-in signal is applied from its terminal end first to modulate the laser beams for the photosensitive bodies 30C, 30D.

The lines scanned by the respective beam spots are kept straight by the cylindrical lenses 24A, 24B, 24C, 24D. The speeds at which the beam spots are moved, i.e., the scanning speeds, are equalized by the $f\theta$ lenses 20A, 20B, 20C, 20D, respectively.

For recording images, the photosensitive bodies 30A, 30B, 30C, 30D are rotated about their own axes in the directions of the arrows (FIG. 1), and are uniformly charged by the respective chargers 26A, 26B, 26C, 26D.

The photosensitive bodies 30A, 30B, 30C, 30D are scanned by the corresponding laser beams applied thereto. At this time, the semiconductor laser of the light source device 10A is energized to emit a laser beam by a yellow image signal indicative of a yellow image. Similarly, the semiconductor lasers of the light source devices 10B, 10C, 10D are energized to emit laser beams by magenta, cyan, and black image signals. The laser beams applied to the photosensitive bodies 30A through 30D scan them to write in or form latent images thereon which correspond to the respective color image signals.

The latent images formed on the photosensitive bodies 30A, 30B, 30C, 30D are then developed by the developing devices 28A, 28B, 28C, 28D to form visible yellow, magenta, cyan, and black images, respectively, with yellow, magenta, cyan, and black toners on the photosensitive bodies 30A, 30B, 30C, 30D, respectively.

The image transfer sheet or recording medium S is delivered by the conveyor belt 34 to the left in FIG. 1. First, the visible yellow image is transferred by the image transfer charger 36A onto the image transfer sheet S, and then the visible magenta, cyan, and black images are successively transferred, in the order named, by the image transfer chargers 36B, 36C, 36D onto the image transfer sheet S. These transferred visible images are thereafter fixed by the fixing device 38 to the image transfer sheet S, which is then discharged out of the color image recording apparatus. Now, a color image is recorded on the image transfer sheet S. After the visible images have been transferred to the image transfer sheet S, residual toners are removed from the photosensitive bodies 30A, 30B, 30C, 30D by the respective cleaners 32A, 32B, 32C, 32D.

Another embodiment of the present invention will be described below.

Figure 3:
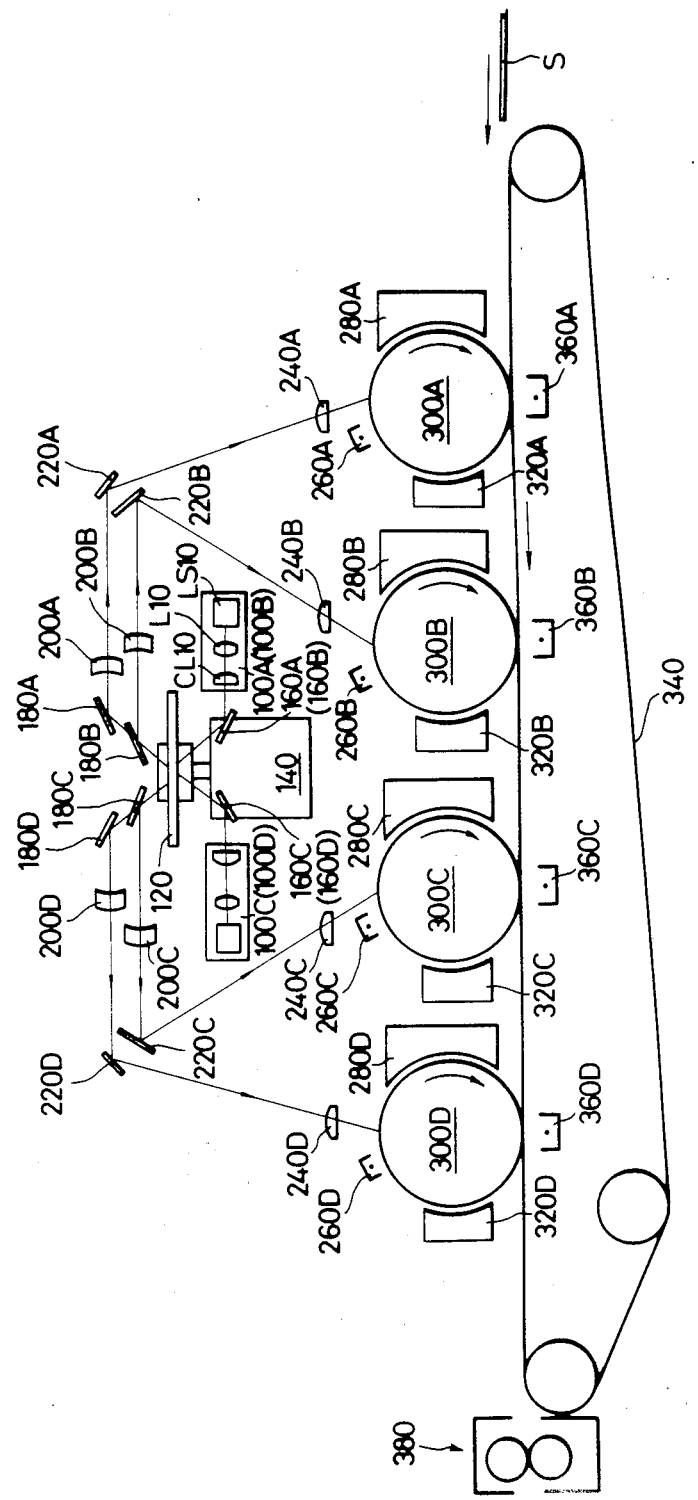
FIG. 3 is a schematic view showing an overall arrangement of another color image recording apparatus used for carrying out a laser beam recording method according to the present invention.

As shown in FIG. 3, a color image recording apparatus has four light source devices 100A, (100B), 100C, (100D), the light source devices 100B, 100D being concealed from view by the light source devices 100A, 100C, respectively.

A hologram disk 120 is rotatably supported on a motor 140. There are four plane mirrors 160A, (160B), 160C, (160D), the plane mirrors 160B, 160D being concealed from view by the motor 140.

The color image recording apparatus also includes plane mirrors 180A, 180B, 180C, 180D, 220A, 220B, 220C, 220D, $f\theta$ lenses 200A, 200B, 200C, 200D, cylindrical lenses 240A, 240B, 240C, 240D, photoconductive photosensitive bodies 300A, 300B, 300C, 300D in the form of drums, chargers 260A, 260B, 260C, 260D, developing devices 280A, 280B, 280C, 280D, cleaners 320A, 320B, 320C, 320D, a conveyor belt 340, image transfer chargers 360A, 360B, 360C, 360D, and an image fixing device 380. Designated at S is an image transfer sheet serving as an image recording medium.

The plane mirrors 160A, 180A, the f$\theta$ lens 200A, the plane mirror 220A, and the cylindrical lens 240A jointly define an optical path extending from the light source device 100A to the photosensitive body 300A. The plane mirrors 160B, 180B, the $\theta$ lens 200B, the plane mirror 220B, and the cylindrical lens 240B jointly define an optical path extending from the light source device 100B to the photosensitive body 300B. The plane mirrors 160C, 180C, the f$\theta$ lens 200C, the plane mirror 220C, and the cylindrical lens 240C jointly define an optical path extending from the light source device 100C to the photosensitive body 300C. Likewise, the plane mirrors 160D, 180D, the f$\theta$ lens 200D, the plane mirror 220D, and the cylindrical lens 240D jointly define an optical path extending from the light source device 100D to the photosensitive body 300D.

The photosensitive bodies 300A, 300B, 300C, 300D each in the form of a drum are identical in construction. The chargers 260A, 260B, 260C, 260D, the developing devices 280A, 280B, 280C, 280D, the cleaners 320A, 320B, 320C, 320D, and the image transfer chargers 360A, 360B, 360C, 360D which are disposed around the respective photosensitive bodies 300A, 300B, 300C, 300D are also identical in construction. However, the developing devices 280A, 280B, 280C, 280D contain color toners of yellow, magenta, cyan, and black, respectively.

Figure 5:
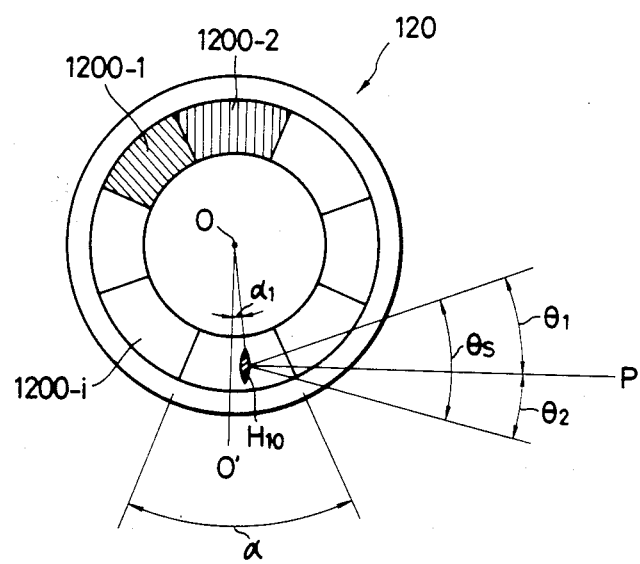
FIG. 5 is a diagram explanating the relationship between the position in which a laser beam is applied to a hologram disk in the apparatus of FIG. 3 and scanning angles.

As show in FIG. 5, the hologram disk 120 has a plurality (eight in the illustrated embodiment) of holograms supported on one surface of a transparent substrate and arranged on a single annular track concentric with the hologram disk 120. Each of the holograms comprises an equally-spaced straight-line grating.

More specifically, the hologram gratings, designated 1200-1, 1200-2, ..., 1200-i, ..., are in an annular pattern serving as a single track having its center aligned with the center O of the hologram disk 120. The hologram gratings 1200-i on the annular track are optically equivalent to each other.

The light source devices 100A, 100B, 100C, 100D are structurally identical to each other. The light source device 100A, for example, comprises a semiconductor laser LS10, a lens L10, and a cylindrical lens CL10.

The semiconductor lasers of the light source devices 100A, 100B, 100C, 100D are energized by color image signals representative of yellow, magenta, cyan, and black images, respectively.

When the light source devices 100A, 100B, 100C, 100D are energized, laser beams emitted therefrom are reflected by the respective plane mirrors 160A, 160B, 160C, 160D to fall on the hologram disk 120 at respective positions H10, H20, H30, H40 (FIG. 4) thereon that correspond to the light source devices 100A, 100B, 100C, 100D, respectively, and that are located on the annular track. The positons H10, H20, H30, H40 are responsible for deflecting the laser beams to scan the photosensitive bodies 300A, 300B, 300C, 300D, respectively. The positions H10, H20, H30, H40 where the laser beams are deflected are positionally different from each other in order to align scanning positions on the photosensitive bodies 300A, 300B, 300C, 300D.

The laser beams applied to the hologram disk 120 are diffracted by the hologram gratings, and then pass along the respective optical paths to reach the photosensitive bodies 300A, 300B, 300C, 300D. The laser beams are converged into beam spots on the respective photosensitive bodies by the cylindrical lenses CL10 of the light source devices, the f$\theta$ lenses 200A through 200D, and the cylindrical lenses 240A through 240D immediately prior to the photosensitive bodies. When the hologram disk 120 is rotated by the motor 140 (FIG. 3) under this condition, the diffracted laser beams are synchronously deflected by the hologram disk 120 to enable the beam spots to scan the photosensitive bodies 300A, 300B, 300C, 300D, respectively.

Figure 4:
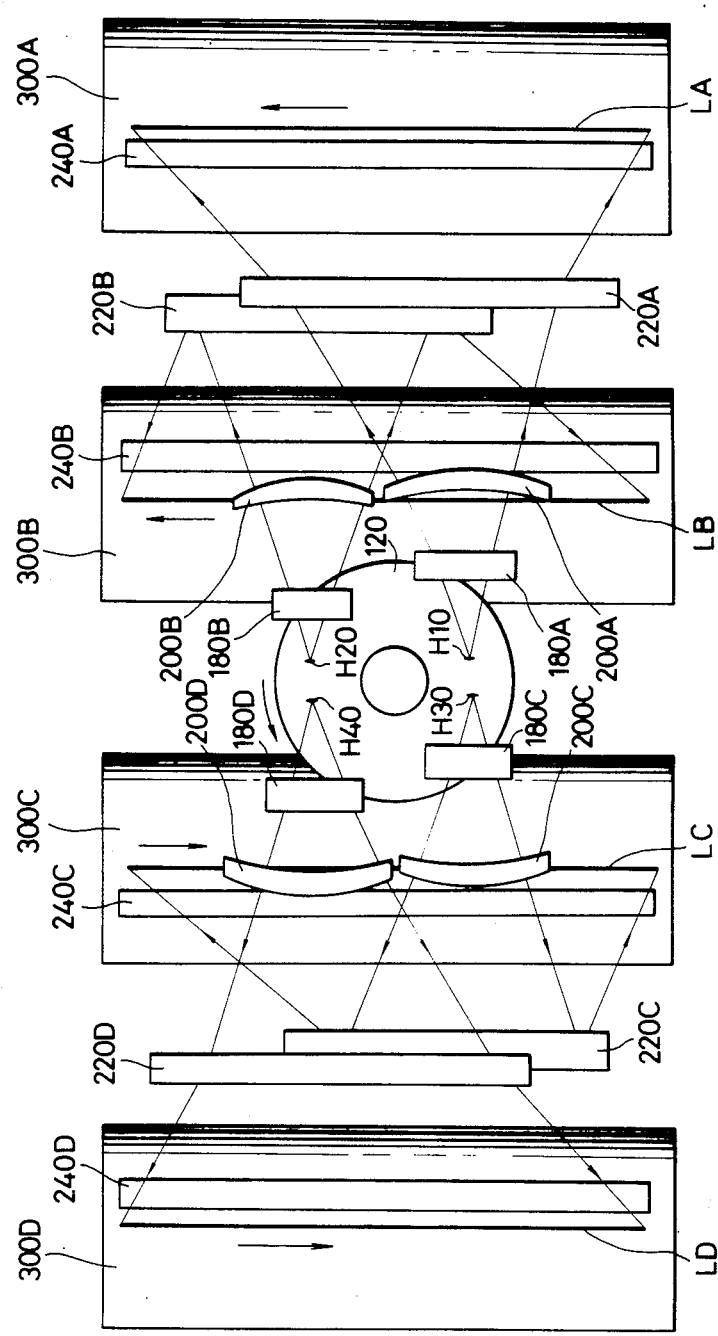
FIG. 4 is a plan view of the color image recording apparatus illustrated in FIG. 3.

Denoted in FIG. 4 at LA, LB, LC, LD are lines scanned by the respective laser beam spots on the photosensitive bodies 300A, 300B, 300C, 300D, as the laser beam spots move along these lines LA, LB, LC, LD in the directions of the arrows therealong.

These lines LA, LB, LC, LD scanned by the respective beam spots are kept straight by the cylindrical lenses 240A, 240B, 240C, 240D. The speeds at which the beam spots are moved, i.e., the scanning speeds, are equalized by the f$\theta$ lenses 200A, 200B, 200C, 200D, respectively.

As shown in FIG. 5, it is assumed the position H10 at which the laser beam is applied to the hologram disk 120 is displaced an angle $\alpha_1$ from a line O—O' (extending abeam of the apparatus or normal to the sheet of FIG. 3) on the hologram disk 120, one sector-shaped hologram grating subtends an angle $\alpha$, the entire angle in which the laser beam is scanned by the hologram disk 120 is expressed by $\theta_s$, the angle in which the laser beam is scanned above an optical axis H10—P is expressed by $\theta_1$, and the angle in which the laser beam is scanned above the optical axis H10—P is expressed by $\theta_2$. Then, the following equations (1), (2) can be established:

$$\theta_1 = \frac{\alpha + 2\alpha_1}{\alpha} \times \frac{\theta_s}{2} \quad (1)$$

$$\theta_2 = \frac{\alpha - 2\alpha_1}{\alpha} \times \frac{\theta_s}{2} \quad (2)$$

The angles $\theta_1$, $\theta_2$ in which the laser beams are scanned can be selected as desired by changing the angle $\alpha_1$ in view of the above equations (1) and (2).

In FIG. 4, the position H10, for example, which corresponds to the photosensitive body 300A is displaced downwardly from the central position on the hologram disk 120. Therefore, the angles $\theta_1$, $\theta_2$ are selected to meet the relationship: $\theta_1 > \theta_2$ as shown in FIG. 5 for normalizing the position in which the photosensitive body 300A is scanned. The other positions H20, H30, H40 are similarly compensated for.

For recording images, the photosensitive bodies 300A, 300B, 300C, 300D are rotated about their own axes in the directions of the arrows (FIG. 3), and are uniformly charged by the respective chargers 260A, 260B, 260C, 260D.

The photosensitive bodies 300A, 300B, 300C, 300D are scanned by the corresponding laser beams applied thereto. At this time, the semiconductor laser of the light source device 100A is energized to emit a laser beam by a yellow image signal indicative of a yellow image. Similarly, the semiconductor lasers of the light source devices 100B, 100C, 100D are energized to emit laser beams by magenta, cyan, and black image signals. The laser beams applied to the photosensitive bodies 300A through 300D scan them to write in or form latent images thereon which correspond to the respective color image signals.

The photosensitive bodies 300A, 300B and the photosensitive bodies 300C, 300D are scanned in opposite directions. Therefore, the beginning and terminal ends of an applied one-line write-in signal for the photosensitive bodies 300C, 300D are switched around or reversed, and the one-line write-in signal is applied from its terminal end first to modulate the laser beams for the photosensitive bodies 300C, 300D.

The latent images formed on the photosensitive bodies 300A, 300B, 300C, 300D are then developed by the developing devices 280A, 280B, 280C, 280D to form visible yellow, magenta, cyan, and black images, respectively, with yellow, magenta, cyan, and black toners on the photosensitive bodies 300A, 300B, 300C, 300D, respectively.

The image transfer sheet or recording medium S is delivered by the conveyor belt 340 to the left in FIG. 3. First, the visible yellow image is transferred by the image transfer charger 360A onto the image transfer sheet S, and then the visible magenta, cyan, and black images are successively transferred, in the order named, by the image transfer chargers 360B, 360C, 360D onto the image transfer sheet S. These transferred visible images are thereafter fixed by the fixing device 380 to the image transfer sheet S, which is then discharged out of the color image recording apparatus. Now, a color image is recorded on the image transfer sheet S. After the visible images have been transferred to the image transfer sheet S, residual toners are removed from the photosensitive bodies 300A, 300B, 300C, 300D by the respective cleaners 320A, 320B, 320C, 320D.

In each of the aforesaid embodiments, a four-color image is recorded by the four photosensitive bodies. However, two-color images can be recorded by employing two photosensitive bodies and two light source devices. Alternatively, multi-color images can be recorded by using five or more photosensitive bodies and five or more light source devices.

Furthermore, instead of the hologram gratings, hologram lenses may be formed on the hologram disk. The laser sources of the light source devices are not limited to the semiconductor lasers, by may be gas lasers such as He-Ne, He-Cd, or Ar lasers, for example. Where gas lasers are employed, the light source devices should include modulating means such as AO (acoustooptic) modulators. Gas lasers may be provided for the respective photosensitive bodies, or a laser beam emitted from a single gas laser may be divided into a plurality of laser beams for the respective photosensitive bodies. Each of the photosensitive bodies may be in the form of an endless belt rather than the drum.

Although certain preferred embodiments have been shown and described, it should be understood that many changes and modifications may be made therein without departing from the scope of the appended claims.

What is claimed is:

1. A method of recording a color image on a recording medium by applying a plurality of laser beams modulated by color image signals representative of mutually differently colored images, respectively, simultaneously to a plurality of photosensitive bodies, respectively, to form latent images thereon which correspond respectively to the color image signals, developing the latent images into mutually differently colored visible images, respectively, and transferring and fixing the visible images to the recording medium, said method comprising the steps of:

providing a hologram disk comprising a circular transparent substrate and a plurality of optically equivalent hologram gratings on a surface of said circular transparent substrate in a single annular pattern;

applying said modulated laser beams to said hologram disk at mutually different positions thereon, each of which is determined by the angles defined by the equations given below:

$$\theta_1 = \frac{\alpha + 2\alpha_1}{\alpha} \times \frac{\theta_s}{2} \quad (1)$$

$$\theta_2 = \frac{\alpha - 2\alpha_1}{\alpha} \times \frac{\theta_s}{2} \quad (2)$$

where $\alpha_1$ is an angle by which the position is displaced from a beam line on the hologram disk, $\alpha$ is an angle subtended by one sector-shaped hologram grating, $\theta_s$ is the entire angle in which the laser beam is scanned by the hologram disk, $\theta_1$ is the angle in which the laser beam is scanned above an optical axis passing through said position, and $\theta_2$ is the angle in which the laser beam is scanned above the optical axis; and rotating said hologram disk to deflect said laser beams simultaneously.

2. A method according to claim 1, wherein said single annular pattern has a center aligned with the center of the hologram disk, said hologram disk being rotated by a motor.

3. A method according to claim 1, wherein said hologram gratings comprise equally-spaced straight-line gratings which are optically equivalent to each other, said straight-line gratings being directionally symmetrical with respect to the center of rotation of the hologram disk.

4. A method according to claim 3, wherein said different positions at which the laser beams are applied to said hologram disk lie on a single straight line extending diametrically across the center of rotation of the hologram disk.

5. A method according to claim 4, wherein said different positions at which the laser beams are applied to said hologram disk lie in a plane containing the center of rotation of the hologram disk and the optical axes of $f\theta$ lenses for directing the laser beams to said respective photosensitive bodies.

6. A method according to claim 5, wherein said photosensitive bodies are axially parallel to each other.

7. A method according to claim 5, wherein said different positions at which said laser beams are applied to said hologram disk are located on opposite sides of the center of rotation of said hologram disk, the laser beams applied at the different positions on the opposite sides of said center being modulated by respective one-line write-in signals of the color image signals which are applied in reversed relation to each other.

8. A method according to claim 1, wherein said hologram disk comprises a circular transparent substrate and a plurality of hologram lenses disposed on a surface of said transparent substrate in a single annular pattern.

9. A method according to claim 1, wherein said laser beams are emitted from semiconductor lasers, respectively.

10. A method according to claim 9, wherein each of said semiconductor lasers cooperates with a lens and a cylindrical lens in constituting a light source device.

11. A method according to claim 10, wherein the light source devices are energized to emit said laser sources by said color image signals, respectively.

12. A method according to claim 10, wherein there are four light source devices which are energized to emit said laser sources by said color image signals, respectively, representative of yellow, magenta, cyan, and black images, respectively.

13. A method according to claim 12, wherein said laser beams emitted from said light source devices are reflected by respective plane mirrors to fall on said scanning medium.

14. A method according to claim 12, wherein said deflected laser beams from said scanning medium are delivered through respective optical means to scan said photosensitive bodies, respectively.

15. A method according to claim 14, wherein each of said optical means comprises a reflecting mirror, and $f\theta$ lens, and a cylindrical lens.

16. A method according to claim 14, wherein a charger, a developing device, and a cleaner are disposed around each of said photosensitive bodies, with a conveyor belt extending in contact with said photosensitive bodies for delivering said recording medium successively past the photosensitive bodies, and image transfer chargers are disposed behind said conveyor belt in confronting relation to said photosensitive bodies, respectively.

17. A method according to claim 1, wherein said laser beams are emitted from gas lasers, respectively.

18. A method according to claim 1, wherein said laser beams are divided from a single laser beam emitted from a single gas laser.

19. A method according to claim 1, wherein each of said photosensitive bodies comprises a photosensitive drum.

20. A method according to claim 1, wherein each of said photosensitive bodies comprises a photosensitive endless belt.

21. A method according to claim 1, wherein said different positions at which said laser beams are applied to said hologram disk are located on opposite sides of said abeam line, the laser beams applied at the different positions on the opposite sides of said abeam line being modulated by respective one-line write-in signals of the color image signals, which are applied in reversed relation to each other.

22. A method of recording a color image on a recording medium by applying a plurality of laser beams modulated by color image signals representative of mutually differently colored images, respectively, simultaneously to a plurality of photosensitive bodies, respectively, to form latent images thereon which correspond respectively to the color image signals, developing the latent images into mutually differently colored visible images, respectively, and transferring and fixing the visible images to the recording medium, said method comprising the steps of:

providing a hologram disk comprising a circular transparent substrate and a plurality of optically equivalent hologram gratings on a surface of said circular transparent substrate in a single annular pattern;

applying said modulated laser beams to said hologram disk in a plane containing the center of rotation of the hologram disk and the optical axes of $f\theta$ lenses for directing the laser beams to said respective photosensitive bodies and on a single straight line extending diametrically across the center of rotation of the hologram disk on opposite sides of the center of rotation of said hologram disk;

rotating said hologram disk to deflect said laser beams simultaneously; and modulating the intensity of the deflected laser beams applied on the opposite sides of the center of rotation of the hologram disk with respective one-line write-in signals of the color image signals, which are applied in reversed relation to each other.

23. A method according to claim 22, wherein said single annular pattern has a center aligned with the center of the hologram disk, said hologram disk being rotated by a motor.

24. A method according to claim 22, wherein said hologram gratings comprise equally-spaced straight-line gratings which are optically equivalent to each other, said straight-line gratings being directionally symmetrical with respect to the center of rotation of the hologram disk.

25. A method according to claim 22, wherein said photosensitive bodies are axially parallel to each other.

26. A method according to claim 22, wherein said hologram disk comprises a circular transparent substrate and a plurality of hologram lenses disposed on a surface of said transparent substrate in a single annular pattern.

27. A method according to claim 22, wherein each of said photosensitive bodies comprises a photosensitive endless belt.

* * * * *